No. 874,657.

PATENTED DEC. 24, 1907.

F. BURGER.
VARIABLE GEARING.
APPLICATION FILED APR. 17, 1907.

2 SHEETS—SHEET 1.

Witnesses
J.G. Hinkel
Milton Libbets

Inventor
Franz Burger
by Foster Freeman Watson & Coit
Attorneys

No. 874,657.  
PATENTED DEC. 24, 1907.  
F. BURGER.  
VARIABLE GEARING.  
APPLICATION FILED APR. 17, 1907.

2 SHEETS—SHEET 2.

Witnesses

Inventor  
Franz Burger  
by Foster Freeman Watson & Coit  
Attorneys

UNITED STATES PATENT OFFICE.

FRANZ BURGER, OF FORT WAYNE, INDIANA, ASSIGNOR OF THREE-FOURTHS TO HENRY M. WILLIAMS, OF FORT WAYNE, INDIANA.

VARIABLE GEARING.

No. 874,657.  Specification of Letters Patent.  Patented Dec. 24, 1907.

Application filed April 17, 1907. Serial No. 368,722.

*To all whom it may concern:*

Be it known that I, FRANZ BURGER, a citizen of the United States, residing at Fort Wayne, Allen county, State of Indiana, have invented certain new and useful Improvements in Variable Gearing, of which the following is a specification.

This invention relates to variable gearing in which one wheel is held in frictional contact with another and adapted to move radially of the latter to effect a change of speed, and in some cases, a reversal of rotation, and has for an object to provide a gearing of this character combining both a frictional and a positive drive, and one in which the speed of the driven member may be varied, the operative connection interrupted or the direction of rotation of the driven member reversed, by a simple manipulation of the gears and in some cases certain associated parts.

In the application of the invention to a motor vehicle a preferred modification is shown in which one of the above mentioned gear wheels is duplicated and certain clutch mechanism is introduced to lock said duplicate gear wheels one at a time, to the vehicle axle, whereby superior results are obtained.

Figure 1:
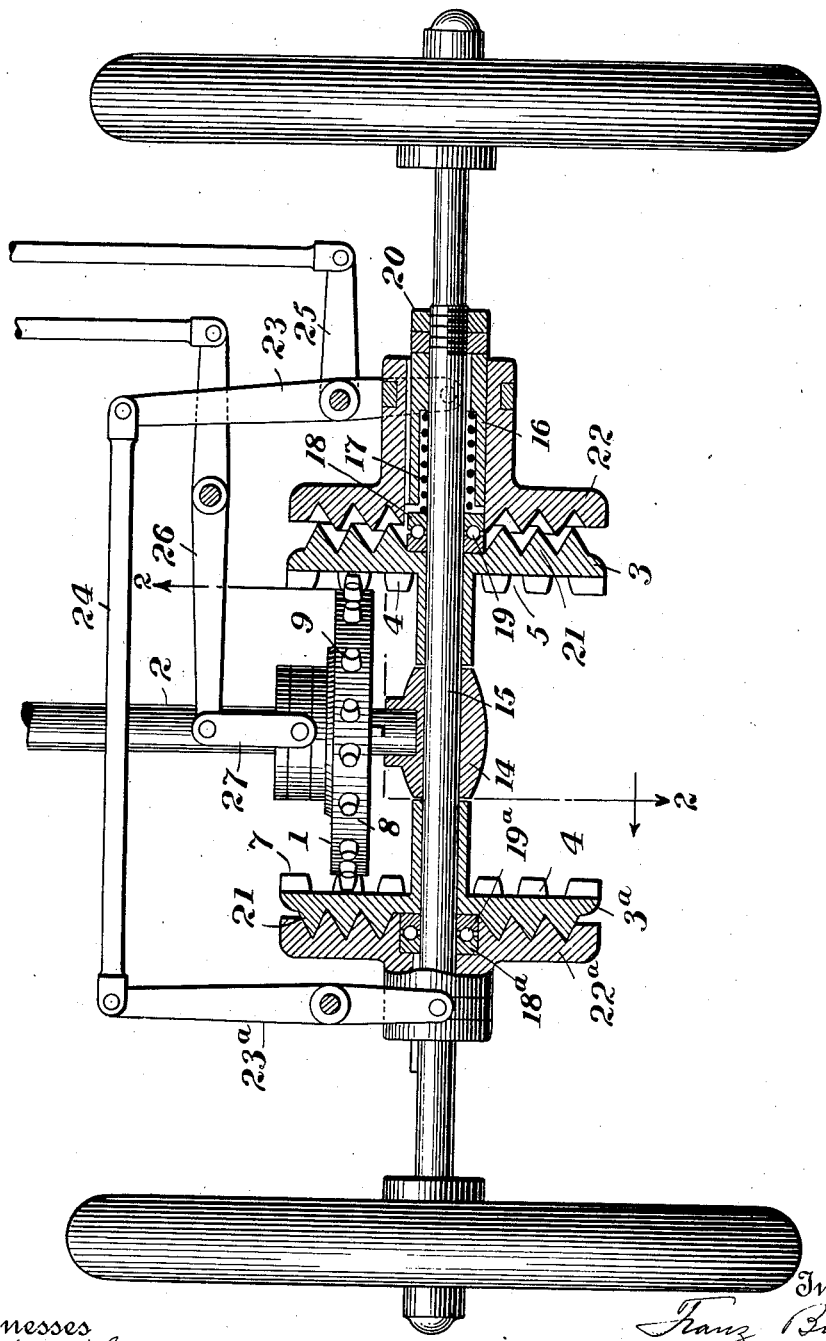
Figure 2:
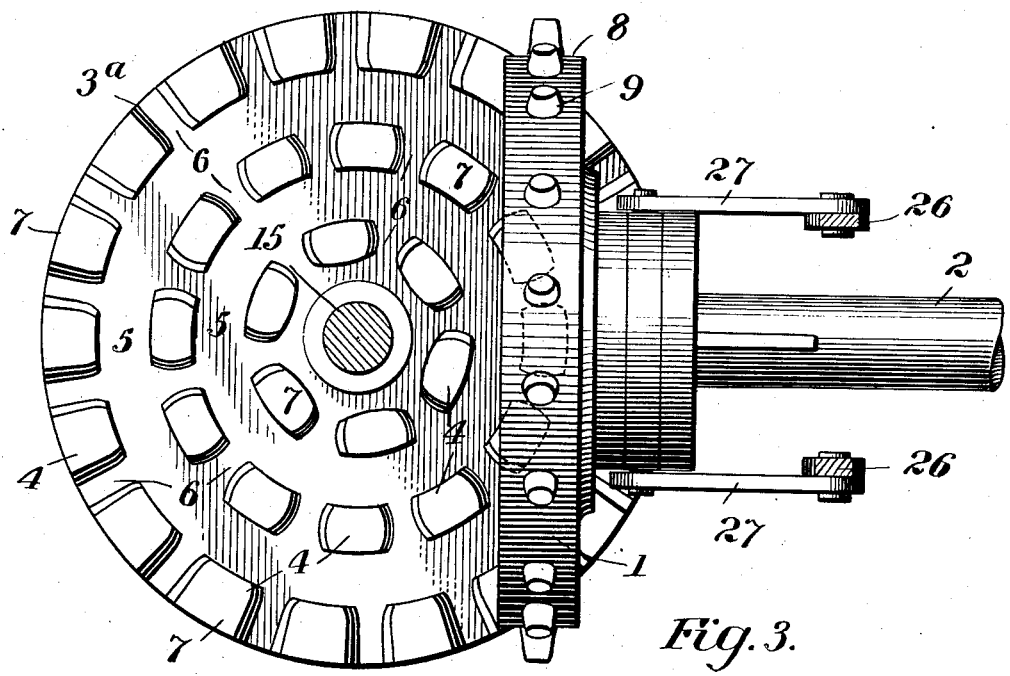
Figure 3:
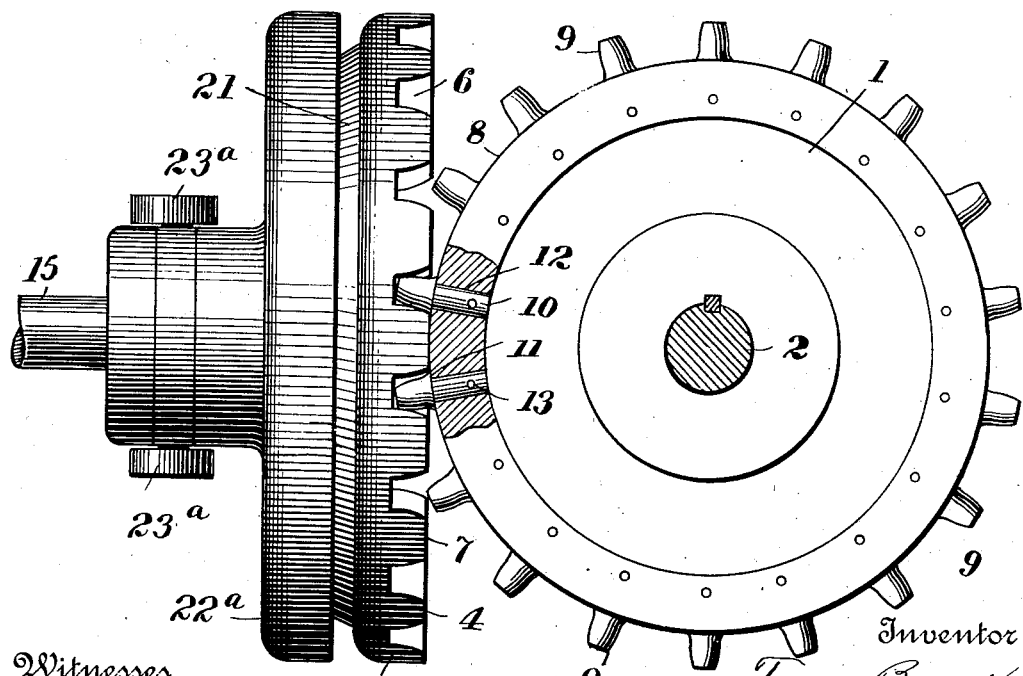

The above and other objects will appear more fully from the following detail description taken with the drawings which form a part hereof and in which Figure 1, is a plan view showing the invention as applied to a motor vehicle, Fig. 2, is an enlarged side elevation and part section on the line 2—2 of Fig. 1, the vehicle wheel being omitted, and Fig. 3, is an enlarged view of the gear wheels and one of the clutch members.

The gearing proper comprises the wheel or pinion 1 splined on a shaft 2 and the transversely mounted wheel or disk 3 adapted to be held in frictional contact with the periphery of said pinion, and across the face of which said pinion is adapted to be shifted for the purpose of varying the relative speed of the wheels. Generally speaking, this method of varying the speed in frictional gearing is well known, but the peculiar construction of the gear wheels herein shown is new and produces a gearing which may be used as a friction drive only or as a positive drive between the members, and at the same time permit of easy and practical varying of speed.

The wheel or disk 3 is provided on its face with a plurality of annular rings or rows of projections 4, the rows being disposed concentrically thereon and at approximately equal distances apart, and the projections being equally spaced in all of the rows to obtain a uniform pitch. The peculiar construction and arrangement of these projections 4 forms one of the essential features of this invention. The concentric disposition of the rows forms between each two an annular channel 5 of a width equal to or slightly greater than the thickness of the pins or teeth on the pinion 1, hereinafter described, and these channels communicate with the adjacent spaces 6 between the projections. These spaces preferably have convexed side walls formed by rounding off the sides of the projections, for the purpose of facilitating the meshing of the pins or teeth therewith as the parts are shifted, as hereinafter more fully set forth. The outer ends of the projections 4 are formed with friction surfaces 7, preferably flat and in a uniform plane, and the projections being considerably larger than the spaces between them, there is thus provided a very appreciable area of friction surface on the disk with which the friction pinion 1 coöperates.

The wheel or friction pinion 1, which, as above intimated, is adapted to slide across the face of the disk 3 to effect a variation of speed, to stop the driven member or to reverse the motion thereof, is provided with a peripheral friction surface 8 which is adapted to coöperate with the friction surfaces 7 on the disk. This friction surface 8 is of a width greater than that of the channels 5 of the disk for the purpose of straddling said channels when shifting the pinion from one row to another. Thus in the operation of changing speed, the forward edge of the surface 8 will frictionally engage the surface 7 of the row of projections to which the pinion is to be shifted before the rear edge of said surface 8 passes from engagement with the surfaces 7 of the row of projections which the pinion is leaving, and a constant frictional contact will at all times be maintained.

Radially projecting from the wheel or pinion 1 are spaced pins or teeth 9, which are of a size and shape and properly arranged to enter the spaces 6 and the channels 5 of the disk 3, without interfering with the frictional engagement of the surfaces 7 and 8.

In the arrangement of these teeth shown in the drawings it will be seen that a comparatively large frictional surface is provided between and at the sides of the teeth in order that the engaging frictional area of the wheels may not be seriously impaired.

The teeth 9 may form an integral part of the pinion 1, but preferably they are independently formed with shanks 10 and shoulders 11, said shanks adapted to fit in recesses 12 in the periphery of the pinion 1, and be secured therein by transverse keys 13, as clearly shown in Fig. 3.

It will be noted that there is a constant frictional engagement of the wheels at all times and this engagement of itself is sufficient to effect an operative driving relation of the mechanism, the teeth acting merely to prevent slipping when the parts are in certain relative positions. For instance, with the pinion positioned over one of the channels, the teeth will work in said channel and the gears will operate by friction alone, whereas, with the pinion over one of the rows of projections, the teeth will mesh between said projections and in addition to the frictional drive obtained there will also be a positive driving relation between the wheels.

It will be further noted that the pinion may be shifted from engagement with one row of projections to another practically at any period in the revolution of the wheels and without disengaging the gears or otherwise interfering with the operation of the mechanism. During such movement, as the teeth of the pinion pass out of mesh with the spaces between one row of projections and into the adjoining channel, the engagement of the periphery of the pinion with the friction surfaces of the projections is still maintained to a more or less degree until and after the said teeth enter the spaces between the next row of projections, and thereby any backlash or jumping is avoided.

It will be understood that the wheels may be so mounted as that the pinion 1 may be shifted to the center of the disk 3 in which position no motion would be transmitted, and it may be further moved to the opposite side of the disk to effect a reversal of rotation of the driven member, and of course the relative speed will vary as the pinion is moved radially of the disk.

It will be seen that this form of gearing may have many applications such as to motor vehicles, motor boats, machinery of various classes, etc., and in Fig. 1 it is shown with slight modification as applied to a motor vehicle. In this application of the invention the pinion shaft 2 may be the motor driving shaft with its end mounted in the tee piece 14 through which the axle 15 passes transversely. In this instance there are two disks 3, 3ª with oppositely disposed friction faces with both of which the pinion 1 is arranged to frictionally contact, thus rotating them in opposite directions. Said disks 3, 3ª, are rotatably mounted upon the transverse shaft or vehicle axle 15 and are provided with suitable means for firmly pressing them towards each other into frictional contact with the pinion 1. This means may comprise a hollow sleeve 16 keyed to the axle 15 and inclosing a spiral spring 17 which presses against a collar 18 surrounding the axle. This collar engages through suitable thrust bearings 19 with the disk 3 or 3ª and as the other of said disks 3, 3ª abuts against a similar collar 18ª and bearings 19ª, the thrust of the spring tends to press both disks firmly in contact with the periphery of the pinion, thus securing a uniform and constant frictional contact. The tension of the spring 17 may be adjusted by suitable means such as nuts 20. It is obvious that instead of having a single spring for pressing both disks together, the spring and coöperating parts shown may be duplicated on the other side of disk 3ª and each act independently of the other. It will be understood from the above description that the disks 3, 3ª travel constantly in opposite directions, and means are therefore provided for operatively connecting the axle of the vehicle with said disks one at a time, the disk selected depending upon the direction in which it is desired the vehicle shall move. For this purpose the backs of the disks 3, 3ª are provided with annular tapering projections 21 which are adapted to engage in corresponding grooves in the faces of clutch members 22, 22ª, which latter are splined on the axle 15 and adapted to move longitudinally thereon for the purpose of clutching said disks, one at a time, to the axle.

Obviously independent levers may be used to move the clutch members, but it is preferred to connect the clutch operating levers 23, 23ª by a link 24, whereupon the operation of the lever 23 by the arm 25 will simultaneously throw clutch member 22 into engagement with disk 3 and clutch member 22ª out of engagement with the disk 3ª, or vice versa, as the case may be. Obviously, also, the clutch members may be neutrally positioned and no motion will be transmitted to the axle through the gears. In this embodiment of the invention there is no necessity for the pinion 1 sliding entirely across the faces of the disks since the reverse is obtained by the clutch mechanism, but it is to be understood that variation of speed may be accomplished by moving the pinion radially of the disks, during which movement the teeth of the pinion slide across the channels 5 and into the spaces 6 in the opposing faces of the disks 3, 3ª. This movement of the pinion may be accomplished by means of a lever 26 operatively connected through a link 27 with the hub of said pinion.

Various modifications may be resorted to without departing from the spirit of the invention and the scope thereof is not limited to the details of construction shown.

I claim,—

1. The combination with a wheel having a plurality of concentrically arranged rings of friction surfaces thereon and channels between said rings, of a pinion having a friction surface to engage said friction surfaces.

2. The combination with a wheel having a plurality of concentrically arranged rings of friction surfaces thereon and channels between said rings, of a pinion having a friction surface wider than said channels to engage said friction surfaces.

3. The combination with a wheel having a plurality of concentric rows of spaced friction surfaces thereon and concentric channels between said rows, of a pinion having a friction surface to engage said friction surfaces.

4. The combination with a wheel having a plurality of concentric rows of spaced friction surfaces thereon and concentric channels between said rows, of a pinion having a friction surface wider than said channels to engage said friction surfaces.

5. The combination with a wheel having a plurality of concentrically arranged rings of friction surfaces thereon and having a concentric channel between said rings, of a pinion adapted to shift across the face of said wheel and having a friction surface to engage the friction surfaces of said rings, the surface of said pinion being wider than said channel whereby the former will straddle the latter as the pinion is shifted from one ring to another.

6. The combination with a wheel having a plurality of concentric rows of spaced friction surfaces thereon and channels between said rows, of a pinion having a friction surface to engage said friction surfaces and having teeth to mesh between the friction surfaces of said wheel and to enter said channels.

7. The combination with a rotatable wheel having a plurality of concentric rows of spaced friction surfaces thereon and having concentric channels between said rows, said channels communicating with the adjacent spaces between said surfaces, of another rotatable wheel mounted to shift across the face of said first wheel and having a friction surface to engage said rows of friction surfaces and having teeth adapted to enter said spaces and channels.

8. The combination of a rotatable disk having a plurality of concentric rows of spaced projections thereon, and concentric channels between said rows, the ends of said projections forming friction surfaces in a uniform plane, a pinion mounted to rotate at an angle to the direction of rotation of said disk, the periphery of said pinion forming a friction surface to engage the friction surfaces of said projections, and spaced teeth mounted on the periphery of said pinion to mesh between said projections.

9. The combination of a rotatable disk having a plurality of concentric rows of spaced projections thereon and concentric channels between said rows, the ends of said projections forming friction surfaces in a uniform plane, a pinion mounted to rotate at an angle to the direction of rotation of said disk and to shift across the face of the latter, the periphery of said pinion forming a friction surface to engage the friction surfaces of said projections, and spaced teeth mounted on the periphery of said pinion to mesh between said projections and enter said channels as the pinion is shifted.

10. The combination with a wheel having a plurality of concentrically arranged rows of spaced projections, the ends of said projections forming friction surfaces, and having concentric channels between said rows communicating with the adjacent spaces between said projections, of a pinion adapted to shift across the face of said wheel and having a friction surface to engage said friction surfaces and teeth to mesh between said projections and to enter said channels as the pinion is shifted.

11. The combination with a wheel having a plurality of annular rows of spaced projections concentrically arranged to form channels between the rows, said channels communicating with the adjacent spaces between said projections and the ends of said projections forming friction surfaces of considerably greater area than that of the surface removed to form the spaces between them, of a pinion mounted to shift across the face of the said disk and having a friction surface to engage said friction surfaces, and teeth on said pinion adapted to mesh with said spaces and to enter said channels as the pinion is shifted, said friction surface being correspondingly of greater area relative to that occupied by said teeth.

12. The combination of a wheel having a plurality of annular rows of spaced projections concentrically arranged to form channels between the rows, said channels communicating with the adjacent spaces between said projections, and the ends of said projections forming friction surfaces, of a pinion mounted to shift across the face of said wheel and having a friction surface wider than said channels to engage the friction surfaces of said projections and to straddle a channel when the pinion is shifted from one row to another, and spaced teeth mounted on the periphery of said pinion to mesh in said spaces and to enter said channels as the pinion is shifted.

13. A gear wheel formed with radial recesses in its periphery, pins or teeth therefor having shanks fitting in said recesses and shoulders abutting against the periphery of said wheel, and transverse keys passing through said shanks and said wheel.

14. The combination with a driving shaft and a pinion thereon having a peripheral friction surface, of a transverse driven shaft, a disk thereon having a plurality of concentrically arranged rings of friction surfaces and channels between said rings narrower than said peripheral friction surface, and means for holding the respective friction surfaces in operative contact.

15. The combination with a driving shaft and a pinion splined thereon having a peripheral friction surface and spaced radial teeth disposed thereon, of a transverse driven shaft, a disk thereon having a plurality of concentrically arranged rings of spaced friction surfaces and channels between said rings, said teeth being adapted to enter said channel and the spaces between said friction surfaces, means for holding the respective friction surfaces in operative contact, and means for shifting said pinion radially of said disk.

16. The combination with a driving shaft and a pinion thereon having a peripheral friction surface and spaced radial teeth, of a transverse driven shaft, a disk thereon having a plurality of concentrically arranged rings of spaced friction surfaces and channels between said rings, the teeth of the pinion being adapted to enter the spaces and channels, and means for holding the respective friction surfaces in operative contact.

17. The combination with the axle of a motor vehicle, of duplicate disks loose thereon and having opposing friction faces, a longitudinally arranged driving shaft, a friction pinion splined thereon engaging with the friction faces of both said disks, means for moving said pinion on said shaft radially of said disks to effect a change of speed, and co-acting clutches for locking one of said disks at a time to said axle.

18. The combination with the axle of a motor vehicle, of duplicate disks loose thereon and having opposing friction faces, a longitudinally arranged driving shaft, a friction pinion splined thereon and arranged between and engaging the friction faces of both said disks, a fixed collar on said axle to hold one of said disks against outward longitudinal movement thereon, spring means engaging the other of said disks for pressing the latter toward said collar and thereby holding both said disks constantly in frictional contact with said pinion, and means for locking said disks, one at a time, to said axle.

19. The combination with the axle of a motor vehicle, of duplicate disks loose thereon and having opposing friction faces, a longitudinally arranged driving shaft, a friction pinion splined thereon and arranged between and engaging the friction faces of both said disks, a fixed collar on said axle to hold one of said disks against outward longitudinal movement thereon, a sliding collar on said axle engaging the other of said disks, a spring adapted to press said sliding collar toward said fixed collar and thereby hold both said disks constantly in frictional contact with said pinion, a hollow sleeve on said axle inclosing said spring and holding the latter against outward movement, nuts for adjusting said collar and thereby the tension of said spring, and means for locking said disks, one at a time, to said axle.

20. The combination with the rear axle of a motor vehicle, of a friction disk thereon, a longitudinal driving shaft, a friction pinion arranged to engage said disk, and means for pressing said disk toward said pinion comprising a collar on said axle engaging said disk, a spring against the collar, a hollow sleeve on said axle inclosing said spring, and means for adjustably holding said sleeve against the tension of the spring.

In testimony whereof I affix my signature in presence of two witnesses.

FRANZ BURGER.

Witnesses:
WM. E. ECKERT,
GEO. D. CRANE.